(12) United States Patent
Lee et al.

(10) Patent No.: US 12,222,294 B2
(45) Date of Patent: Feb. 11, 2025

(54) OPTICAL INSPECTION DEVICE AND INSPECTING METHOD USING THE SAME

(71) Applicant: Samsung Display Co., LTD., Yongin-si (KR)

(72) Inventors: Jeong Moon Lee, Seoul (KR); Dae Hong Kim, Seongnam-si (KR); Hyung Jin Lee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 252 days.

(21) Appl. No.: 17/737,663

(22) Filed: May 5, 2022

(65) Prior Publication Data

US 2023/0141957 A1 May 11, 2023

(30) Foreign Application Priority Data

Nov. 8, 2021 (KR) .......................... 10-2021-0152481

(51) Int. Cl.
*G01N 21/88* (2006.01)
*G01N 21/31* (2006.01)
(Continued)

(52) U.S. Cl.
CPC ..... *G01N 21/8806* (2013.01); *G01N 21/3151* (2013.01); *G01N 21/33* (2013.01); *G01N 21/35* (2013.01); *G01N 21/8422* (2013.01); *G01N 21/88* (2013.01); *G01N 21/8851* (2013.01); *G01N 21/94* (2013.01); *G01N 21/31* (2013.01); *G01N 2021/3155* (2013.01); *G01N 2021/3174* (2013.01); *G01N 2021/8835* (2013.01);
(Continued)

(58) Field of Classification Search
CPC .......... G01N 21/8806; G01N 21/3151; G01N 21/33; G01N 21/35; G01N 21/8422; G01N 21/8851; G01N 21/94; G01N 21/95; G01N 2021/3155; G01N 2021/3174; G01N 2021/8835; G01N 2021/8845; G01N 2021/945; G01N 2201/066; G01N 21/88
USPC ................................ 356/237.1, 237.2, 237.3
See application file for complete search history.

(56) References Cited

U.S. PATENT DOCUMENTS 5,963,328 A * 10/1999 Yoshida ............. G01N 21/8806
356/600
2003/0059103 A1* 3/2003 Shiomi ................ G01N 21/956
382/144
(Continued)

FOREIGN PATENT DOCUMENTS

CN 103837540 A * 6/2014 ............. G01N 21/01
CN 104007116 A * 8/2014 ............. G01N 21/88
(Continued)

*Primary Examiner* — Michelle M Iacoletti
*Assistant Examiner* — Noah J. Haney
(74) *Attorney, Agent, or Firm* — Lewis Roca Rothgerber Christie LLP

(57) ABSTRACT

An optical inspection device includes: a barrel; a first light source unit at a first side of the barrel and configured to irradiate light of a first wavelength range through a first light path; a second light source unit at a second side of the barrel, the second side being different from the first side, and configured to irradiate light of a second wavelength range that is different from the first wavelength range through a second light path; and a camera. At least a portion of the first light path is different from the second light path.

19 Claims, 16 Drawing Sheets

(51) Int. Cl.
*G01N 21/33* (2006.01)
*G01N 21/35* (2014.01)
*G01N 21/84* (2006.01)
*G01N 21/94* (2006.01)
*G01N 21/95* (2006.01)

(52) U.S. Cl.
CPC ............... *G01N 2021/8845* (2013.01); *G01N 2021/945* (2013.01); *G01N 21/95* (2013.01); *G01N 2201/066* (2013.01)

(56) References Cited

U.S. PATENT DOCUMENTS

| | | | | | |
|---|---|---|---|---|---|
| 2006/0114463 | A1* | 6/2006 | Detinkin | ............... | G01N 21/958 356/431 |
| 2006/0251315 | A1* | 11/2006 | Okabe | ............... | G01N 21/94 382/141 |
| 2011/0069313 | A1* | 3/2011 | Sakai | ............... | G06T 7/001 356/369 |
| 2012/0242826 | A1* | 9/2012 | Holmes | ............... | A61B 1/0638 348/E9.003 |
| 2014/0307080 | A1* | 10/2014 | Kim | ............... | G01N 21/94 348/86 |
| 2015/0346107 | A1* | 12/2015 | Kim | ............... | G01N 21/958 356/402 |
| 2016/0047752 | A1* | 2/2016 | Ahn | ............... | G01N 21/9501 356/364 |
| 2018/0158185 | A1* | 6/2018 | Wang | ............... | H04N 23/60 |
| 2019/0242812 | A1* | 8/2019 | Ben-Ezer | ............... | G01N 21/33 |
| 2020/0018707 | A1* | 1/2020 | Hanabusa | ............... | F21V 7/043 |
| 2021/0080399 | A1* | 3/2021 | Hatahori | ............... | G01N 21/8806 |
| 2021/0131961 | A1* | 5/2021 | Ohno | ............... | G01N 21/474 |
| 2022/0005157 | A1* | 1/2022 | Shu | ............... | G06T 7/13 |
| 2023/0184692 | A1* | 6/2023 | Oda | ............... | B65B 57/02 348/92 |

FOREIGN PATENT DOCUMENTS

| | | | | |
|---|---|---|---|---|
| EP | 3 179 205 A1 | | 6/2017 | |
| KR | 10-2010-0108877 A | | 10/2010 | |
| KR | 10-1277698 B1 | | 6/2013 | |
| KR | 10-1322909 B1 | | 10/2013 | |
| KR | 10-2015-0086633 A | | 7/2015 | |
| KR | 10-2017-0053707 A | | 5/2017 | |
| KR | 20180054416 A | * | 5/2018 | ........... G01N 21/956 |
| TW | 201411120 A | * | 3/2014 | ........... G01B 11/303 |

* cited by examiner

OPTICAL INSPECTION DEVICE AND INSPECTING METHOD USING THE SAME

CROSS-REFERENCE TO RELATED APPLICATION

This application claims priority to and the benefit of Korean Patent Application No. 10-2021-0152481, filed in the Korean Intellectual Property Office on Nov. 8, 2021, the entire content of which is incorporated herein by reference.

BACKGROUND

1. Field

Aspects of embodiments of the present disclosure relate to an optical inspection apparatus and an inspection method using the same.

2. Description of the Related Art

An electronic device, such as a display device, includes a substrate and several films stacked on the substrate. After forming the films, an inspection step for the films is performed to determine whether foreign material is present, whether there is a defect in the films, whether there is a residual film that has not been removed, and the like by using an image acquired after imaging a target object to be inspected by using an optical camera.

The above information disclosed in this Background section is for enhancement of understanding of the background of the present disclosure, and therefore, it may contain information that does not form prior art that is already known to a person of ordinary skill in the art.

SUMMARY

Embodiments of the present disclosure provide accurate and easy inspection for foreign material presence, defects, or a residual film of a transparent film or an opaque film included in an electronic device, such as a display device.

An embodiment of the present disclosure provides an optical inspection device including: a barrel; a first light source unit at a first side of the barrel and configured to irradiate light of a first wavelength range through a first light path; a second light source unit at a second side of the barrel, the second side being different from the first side, and configured to irradiate light of a second wavelength range that is different from the first wavelength range through a second light path; and a camera. At least a portion of the first light path is different from the second light path.

The first light source unit may be configured to emit ultraviolet or infrared light, and the second light source unit may be configured to emit light of a visible range.

The second light source unit may include a white light source and a color selector between the white light source and the barrel, and the color selector may include a plurality of color filters.

The color selector may further include a rotatable turntable, and the color filters may be at an edge of the turntable.

The color filters may include a white filter and a plurality of color filters.

The optical inspection device may further include a driver configured to select one of the color filters and align it with the second light path according to a color or transparency of a target to be inspected.

The color filters may include a plurality of color filters having a complementary color relationship with each other.

The optical inspection device may further include an image processing unit configured to receive an image captured by the camera and to process the image to extract an image of a target to be inspected.

The image processing may include binarization processing.

Another embodiment of the present disclosure provides an optical inspection device including: a first light source unit configured to irradiate ultraviolet or infrared light through a first light path; a second light source unit configured to irradiate visible light through a second light path; and a camera configured to capture an image of a target object irradiated with light from the first light source unit or the second light source unit. At least a portion of the first light path is different from the second light path.

The second light source unit may include a white light source and a color selector including a plurality of color filters.

The color selector may further include a turntable configured to rotate the color filters.

The color filters may include a plurality of color filters having a complementary color relationship with each other.

Another embodiment of the present disclosure includes an inspection method using an optical inspection device. The optical inspection device includes a first light source unit and a second light source unit configured to irradiate light of different wavelength ranges, and the method includes: selecting the first light source unit or the second light source unit according to transparency or a color of a target object to be inspected; and capturing an image of the target object to be inspected by irradiating light from the selected one of the first light source unit or the second light source unit to the target object.

The first light source unit may be configured to irradiate ultraviolet or infrared light, the selecting the first light source unit or the second light source unit may include selecting the first light source unit when the target object to be inspected is a transparent film, and the captured image of the target object may include a fringe area corresponding to the target object to be inspected.

The inspection method may further include processing the captured image of the target object to be inspected to extract the fringe area.

The second light source unit may be configured to irradiate visible light, the selecting the first light source unit or the second light source unit may include selecting the second light source unit when the target object to be inspected is a colored film or an opaque film, and the second light source unit may include a white light source and a color selector including a plurality of color filters.

The inspection method may further include processing the captured image of the target object to be inspected to extract an image in which a deviation from surroundings of the image of the target object to be inspected is increased.

The capturing of the image of the target object may include irradiating visible light of a first color and a second color in a complementary color relationship with the first color to generate a first image and a second image having different luminance for an image of the target object to be inspected.

The inspection method may further include: processing the first image and the second image; and extracting an image in which cleanness of the image of the target object to be inspected is increased by merging luminance intensities of the processed first image and the processed second image.

According to embodiment of the present disclosure, an accurate and easy inspection for foreign material presence, a defect, or a residual film of a transparent film or an opaque film included in an electronic device, such as a display device, is provided.

DETAILED DESCRIPTION

Figure 1:
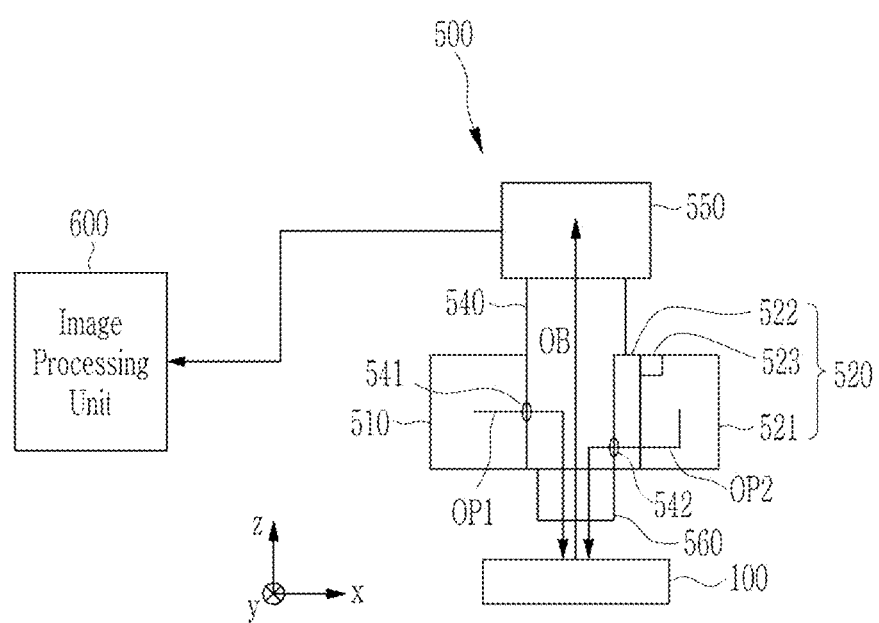
FIG. 1 illustrates an optical inspection device according to an embodiment.

The present disclosure will be described more fully hereinafter with reference to the accompanying drawings, in which embodiments of the present disclosure are shown. As those skilled in the art would realize, the described embodiments may be modified in various different ways, all without departing from the spirit or scope of the present disclosure.

To clearly describe the present disclosure, aspects, features, and parts that are irrelevant to the description may be omitted, and like numerals refer to like or similar constituent elements throughout the specification.

Further, because sizes and thicknesses of constituent members shown in the accompanying drawings are arbitrarily given for better understanding and ease of description, the present disclosure is not limited to the illustrated sizes and thicknesses. For example, in the drawings, the thicknesses of layers, films, panels, regions, etc., may be exaggerated for clarity.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be understood that when an element, such as a layer, film, region, or substrate, is referred to as being "on," "connected to," or "coupled to" another element, it can be directly on, connected to, or coupled to the other element or intervening elements may also be present. When an element is referred to as being "directly on," "directly connected to," or "directly coupled to" another element, there are no intervening elements present. Further, in the specification, the word "on" or "above" can indicate an elements position on or below the object portion and does not necessarily mean positioned on the upper side of the object portion based on a gravitational direction. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

In addition, unless explicitly described to the contrary, the words "have," "include," and "comprise," and variations such as "has," "having," "includes," "including," "comprises," or "comprising" will be understood to imply the inclusion of stated elements but not the exclusion of any other elements.

Further, in the specification, the phrase "in a plan view" means when an object portion is viewed from above, and the phrase "in a cross-sectional view" means when a cross-section taken by vertically cutting an object portion is viewed from the side.

As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

An optical inspection device according to an embodiment will be described with reference to FIG. 1 and FIG. 2.

Figure 2:
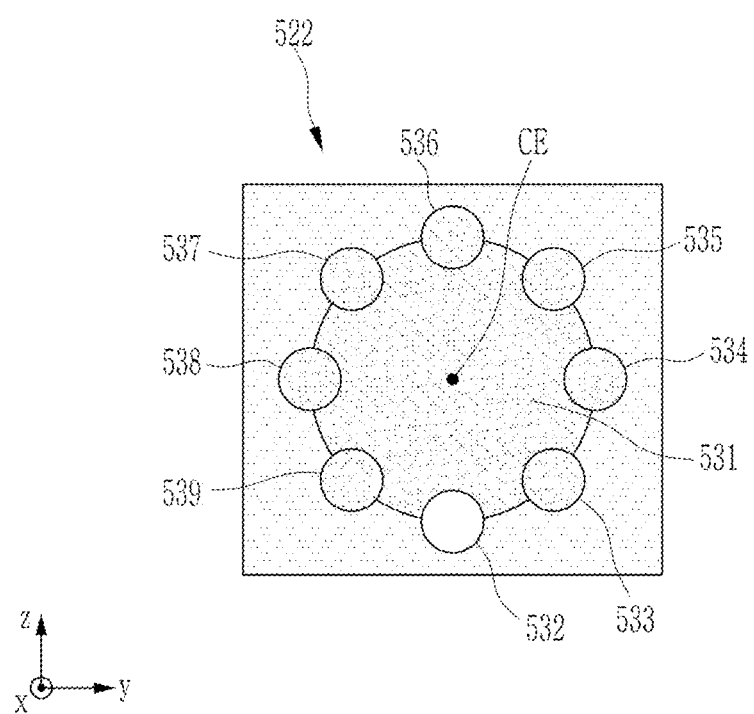
FIG. 2 illustrates a top plan view of a color selection unit included in an optical inspection device according to an embodiment.

FIG. 1 illustrates an optical inspection device according to an embodiment, and FIG. 2 illustrates a top plan view of a color selection unit included in an optical inspection apparatus according to an embodiment.

Referring to FIG. 1, an optical inspection device 500 according to an embodiment, which is an optical inspection device for inspecting various films formed in a manufacturing process of an electronic device, such as a display device, may inspect for presence (e.g., foreign object presence), a defect, and/or a residual film (e.g., a residual transparent or opaque film).

The optical inspection device 500 may include a first light source unit 510, a second light source unit 520, a barrel 540, a camera 550, and an optical unit 560.

The first light source unit 510 and the second light source unit 520 may irradiate light of different wavelength ranges to a target object 100 to be inspected.

The first light source unit 510 may irradiate light in a wavelength range other than visible light. For example, the first light source unit 510 may irradiate ultraviolet light or infrared light to the target object 100 through a first optical path OP1. A width of a wavelength band of light irradiated from the first light source unit 510 may be about 300 nm or less, but the present disclosure is not limited thereto.

The second light source unit 520 may emit light in a visible range. For example, the second light source unit 520 may irradiate monochromatic light (e.g., a specific monochromatic light), such as white, red, green, or blue light to the target object 100 through a second optical path OP2.

The barrel 540 includes a space through which light irradiated from the first light source unit 510, light irradiated from the second light source unit 520, and/or light from the target object 100 passes. For example, the barrel 540 includes a space extending in a z direction inside so that the first optical path OP1 of the light irradiated from the first light source unit 510, the second optical path OP2 of the light irradiated from the second light source unit 520, or an optical path OB of the light from the target object 100 may pass in approximately the z direction.

The optical unit 560 may be positioned between the barrel 540 and the target object 100. The first light path OP1 of the first light source unit 510, the second light path OP2 of the second light source unit 520, and/or the light path OB of light from the target object 100 may pass through the optical unit 560. The optical unit 560 may include at least one optical member configured to control an optical path of the light irradiated from the first light source unit 510, the light irradiated from the second light source unit 520, and/or the light from the target object 100. For example, the optical unit 560 may include at least one lens.

The first light source unit 510 may be positioned on a first side surface of the barrel 540. A transparent portion (or a first light-transmitting portion) 541, in the form of an opening through which light from the first light source unit 510 can pass, may be positioned on a first side surface of the barrel 540 adjacent to the first light source unit 510. The barrel 540 may include at least one mirror positioned in the first light path OP1 such that the first optical path OP1, through which light from the first light source unit 510 may be irradiated to the target object 100 positioned below the optical unit 560, may be formed.

The second light source unit 520 may be positioned on a second side surface of the barrel 540. A transparent portion (or a second light-transmitting portion) 542 in the form of an opening through which light from the second light source unit 520 can pass may be positioned on a second side surface of the barrel 540 adjacent to the second light source unit 520. The barrel 540 may include at least one mirror positioned in the second light path OP2 such that the second optical path OP2, through which light from the second light source unit 520 may be irradiated to the target object 100 positioned below the optical unit 560, may be formed.

The second light source unit 520 may include a white light source 521 and a color selector 522. The color selector 522 may be positioned between the barrel 540 and the white light source 521.

The color selector 522 may pass the white light from the white light source 521 as it is or may filter it into a specific monochromatic light and pass it toward the barrel 540.

Referring to FIG. 2, the color selector 522 may include, for example, a turntable 531 configured to rotate on an yz plane about a center CE and a plurality of color filters 532, 533, . . . , and 539 positioned at an edge of the turntable 531.

The color filters 532, 533, . . . , and 539 may be positioned at a same distance (e.g., equidistant) from the center CE and may be arranged in a substantially circular shape.

The color filters 532, 533, . . . , and 539 include a white filter 532 that can pass white light from the white light source 521 as it is (e.g., without modification or filtering), and color filters 533, . . . , and 539 of red, green, and blue that can filter and pass light of specific colors.

Referring to FIG. 1, the color selector 522 may further include a driver 523 configured to rotate a plurality of color filters 532, 533, . . . , and 539 with respect to the center CE. The color filters 532, 533, . . . , and 539 selected by the driver 523 may be arranged on the second light-transmitting portion 542 of the barrel 540, for example, the second light path OP2. Accordingly, the white light from the white light source 521 may pass through the color filters 532, 533, . . . , and 539 arranged in the second light-transmitting portion 542 and may travel along the second optical path OP2 to be irradiated to the target object 100 to be inspected.

The color filters 532, 533, . . . , and 539 may include two or more color filters having a complementary color relationship with each other.

The color filters 532, 533, . . . , 539 may be modified with filters of different colors according to different embodiments.

The optical inspection device 500 according to an embodiment may select only one of the first light source unit 510 and the second light source unit 520 to irradiate light to the target object 100 when capturing an image of the target object 100. That is, light may be irradiated to the target object 100 using only one of the first optical path OP1 and the second optical path OP2.

The camera 550 may be a camera including a photosensor, such as a charge-coupled device, but the present disclosure is not limited thereto.

The target object 100 is an electronic device, such as a display panel or a part thereof, in a manufacturing process and may include a film or layer to be inspected.

The optical inspection device 500 according to an embodiment may further include an image processing unit (e.g., an image processor) 600. The image processing unit 600 may be connected to the camera 550 to receive image information of the target object 100.

The image processing unit 600 may extract an image of a target to be inspected from an image of the target object 100 captured by the camera 550 so as to be seen clearly. For example, the image processing unit 600 may extract an image of the target to be inspected by processing the image of the target to be inspected, such as a specific film or layer to make it stand out through binarization. Accordingly, the target to be inspected can be accurately and easily inspected by increasing visibility of only the image of the target to be inspected in the captured image including a background.

The binarization process may include, for example, a process in which wavelengths that are less than a wavelength of one specific color (e.g., a reference wavelength) are expressed as one type of color, and wavelengths above the wavelength (e.g., the reference wavelength) are expressed as a type of color that is different from the type of color. For example, one color may be black and the other may be white, or vice versa.

The first light source unit 510 may be used when a target to be inspected, such as a film to be inspected of the target object 100, is a transparent film. A fringe phenomenon caused by interference may be well expressed by irradiating light from the first light source unit 510 to the transparent film, and an image of the target to be inspected may be extracted by extracting a fringe region through image processing by the image processing unit 600. Herein, the transparent film may be a colorless transparent film, but the present disclosure is not limited thereto.

The second light source unit 520 may be used when a target to be inspected, such as a film to be inspected in the target object 100, is a colored film or an opaque film. The image of the film to be inspected may appear clearer by a difference in reflectance or absorption of light of the target to be inspected compared to surroundings depending on a condition of the colored film or the opaque film to be inspected and a wavelength of light irradiated from the second light source unit 520. The image of the target to be inspected may be clearly extracted by further increasing (or maximizing) a deviation thereof through image processing by the image processing unit 600.

An inspection method using an optical inspection device according to an embodiment will be described with reference to FIG. 3 to FIG. 7 together with FIG. 1 and FIG. 2 described above.

Figure 3:
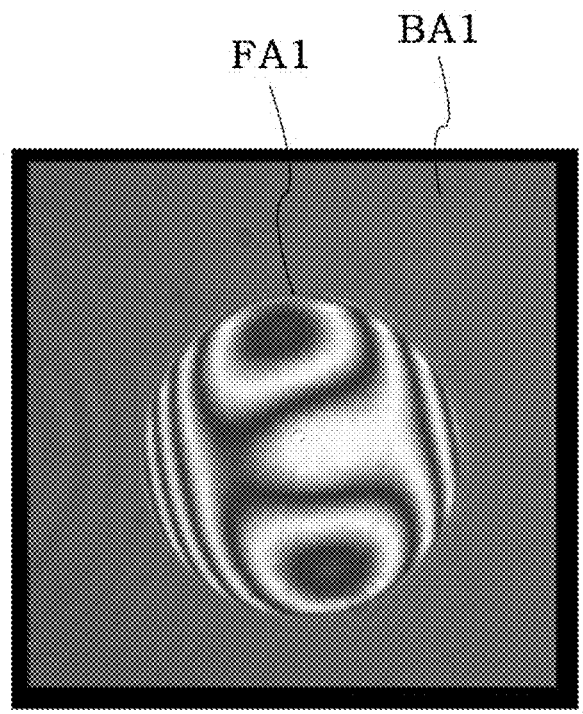
FIG. 3 illustrates an image captured by an optical inspection device according to an embodiment.
Figure 4:
FIG. 4 illustrates an image obtained by extracting a fringe area from the image of FIG. 3, FIGS. 5 and 6 illustrate images captured by an optical inspection device according to an embodiment.

FIG. 3 is an image captured by an optical inspection device according to an embodiment, and FIG. 4 is an image obtained by extracting a fringe area from the image of FIG. 3.

When the target to be inspected in the target object 100 is a transparent film, the first light source unit 510 of the optical inspection device 500 is selected to irradiate the target object 100 with ultraviolet or infrared light through the first optical path OP1 to the target object 100.

Then, an image including a fringe area FA1 corresponding to the target to be inspected may be captured by the camera 550 as illustrated in FIG. 3 due to the occurrence of light interference in the target film to be inspected. A vicinity of the target to be inspected, that is, the background, may be a background area BA1 without a fringe image.

The captured image illustrated in FIG. 3 is transferred to the image processing unit 600, and the image processing unit 600 extracts the fringe area FA1, which is an image to be inspected, through image processing, such as binarization processing.

As a result, a fringe area FA2 may be clearly processed compared to a background area BA2 processed illustrated in FIG. 4, thereby extracting an image of the target to be inspected with high visibility. It is possible to accurately and easily inspect foreign material presence, a defect, and/or a residual film of a film to be inspected through inspection of the extracted image, that is, the extracted fringe area FA2.

Figure 5:
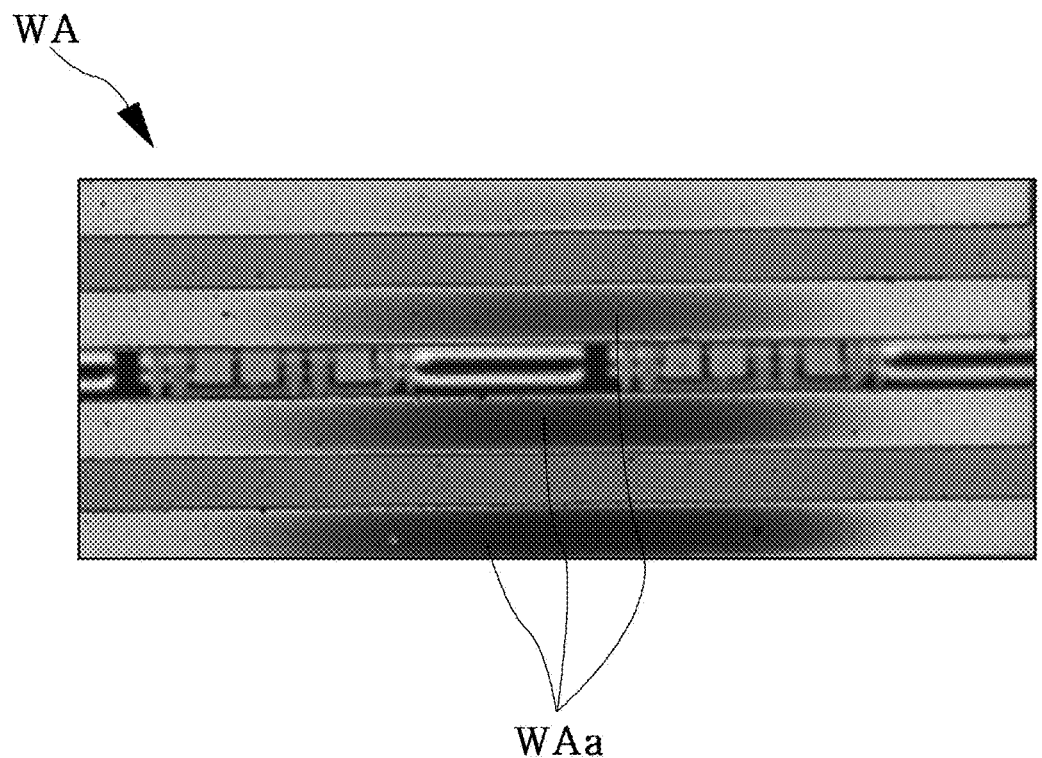
Figure 6:
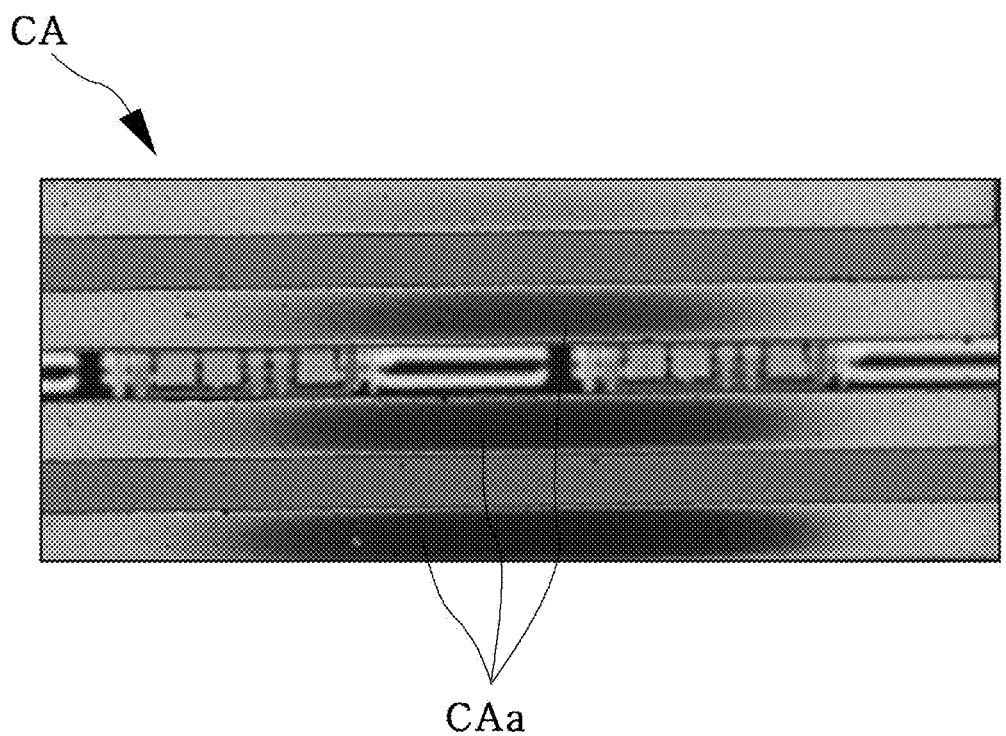
Figure 7:
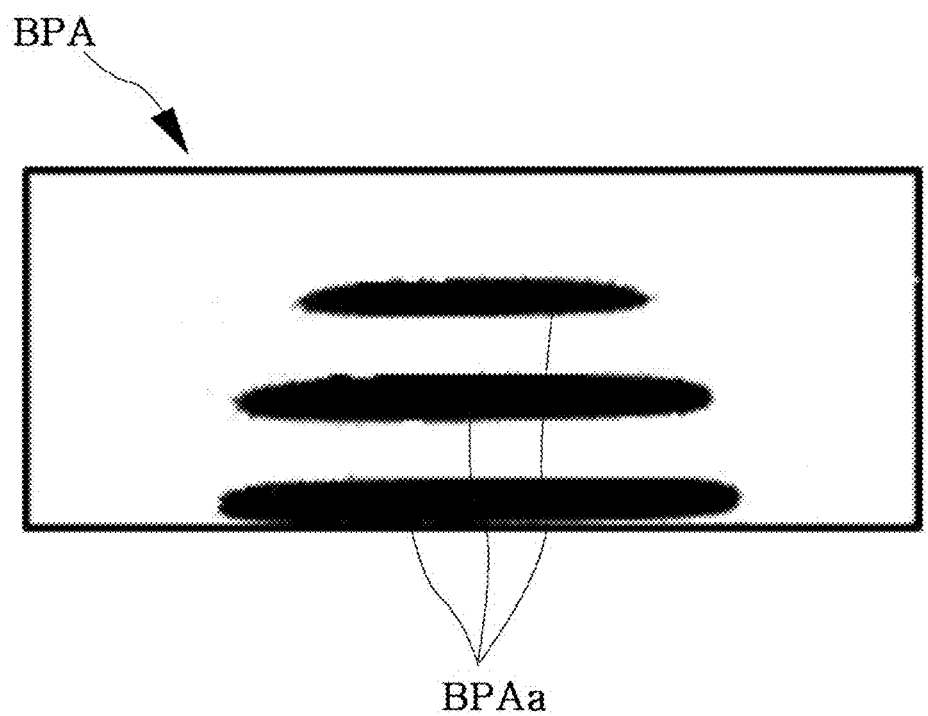
FIG. 7 illustrates an image obtained by processing the image of FIG. 5 or FIG. 6.

FIGS. 5 and 6 are images captured by an optical inspection device according to an embodiment, and FIG. 7 is an image obtained by processing the image of FIG. 5 or FIG. 6.

When the target to be inspected in the target object 100 is a colored film or an opaque film, the second light source unit 520 of the optical inspection device 500 is selected to irradiate the target object 100 with white or monochromatic visible light through the second optical path OP2. In this case, the color selector 522 may select a wavelength of an irradiated color by aligning a white (or other specific color) filter to a position of the second optical path OP2.

A color of the second light source unit 520 to be irradiated may be selected depending on a color of the colored film or transparency of the opaque film to be inspected. In this case, an image of the film to be inspected may be displayed more clearly due to a difference in reflectivity or absorbance of the film to be inspected to the irradiated light compared to a surrounding area of the film to be inspected.

FIG. 5 illustrates an image WA captured by selecting one color filter by the color selector 522, and FIG. 6 illustrates an image CA captured by selecting another color filter by the color selector 522. For example, FIG. 5 illustrates an image WA captured by selecting the white filter 532 by the color selector 522, and FIG. 6 illustrates an image CA obtained by selecting a color filter 533, . . . , and 539 other than the white filter 532 by the color selector 522.

Images WAa and CAa of each target object that is clearer or that has high visibility may be selected by comparing the two captured images WA and CA. The selected image WAa or CAa may be sent to the image processing unit 600 for image processing.

The image processing unit 600 may further increase the visibility of the image of the target to be inspected by further increasing (or maximizing) the deviation for a remaining surrounding area of the image WAa or CAa of the target to be inspected through image processing such as binarization.

Accordingly, as shown in FIG. 7, it is possible to extract an extracted image BPA including a clear image BPAa of the target to be inspected. It is possible to accurately and easily inspect foreign material presence, a defect, and/or a residual film of a film to be inspected through inspection of the image BPAa of the target of the extracted image BPA.

An inspection method using an optical inspection device according to an embodiment will be described with reference to FIG. 8 to FIG. 16 together with the drawings previously described.

Figure 8:
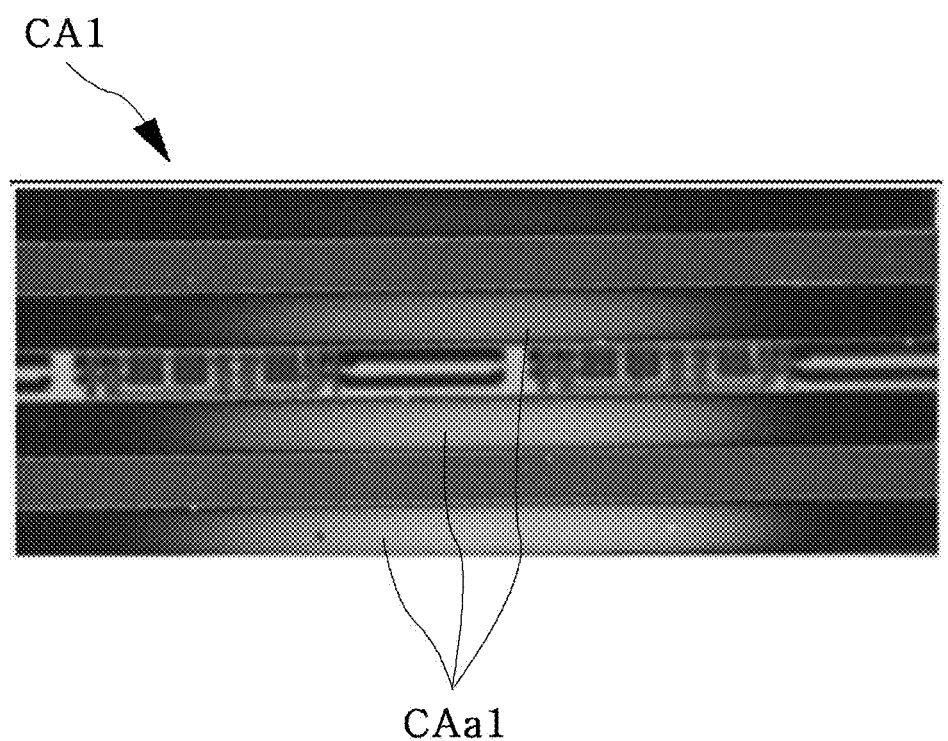
FIG. 8 illustrates an image captured by an optical inspection device according to an embodiment.
Figure 9:
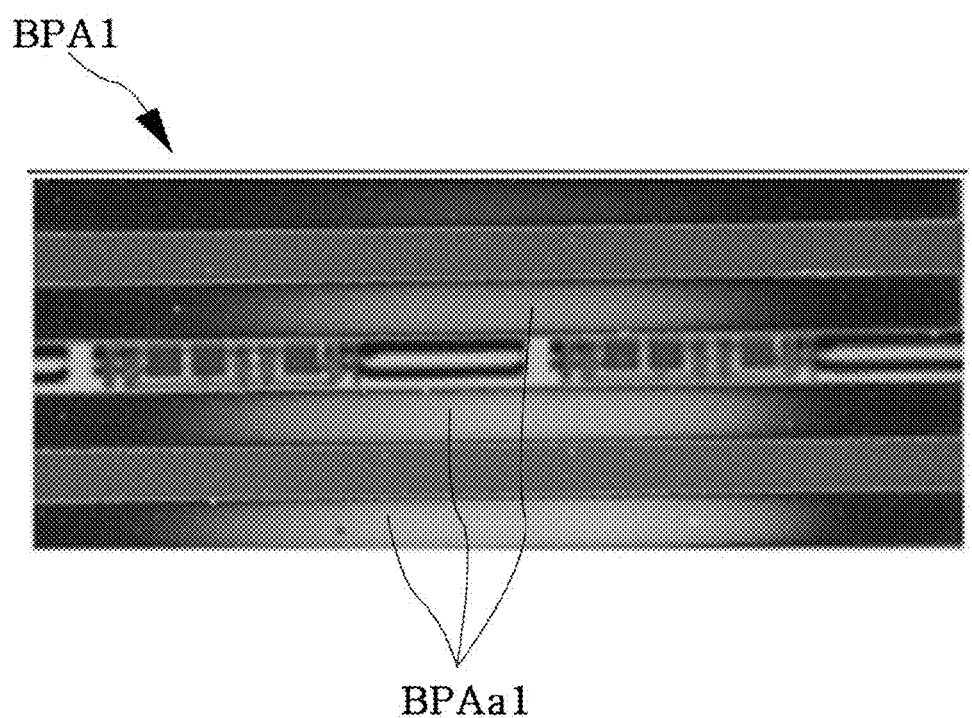
FIG. 9 illustrates an image obtained by processing the image of FIG. 8.
Figure 10:
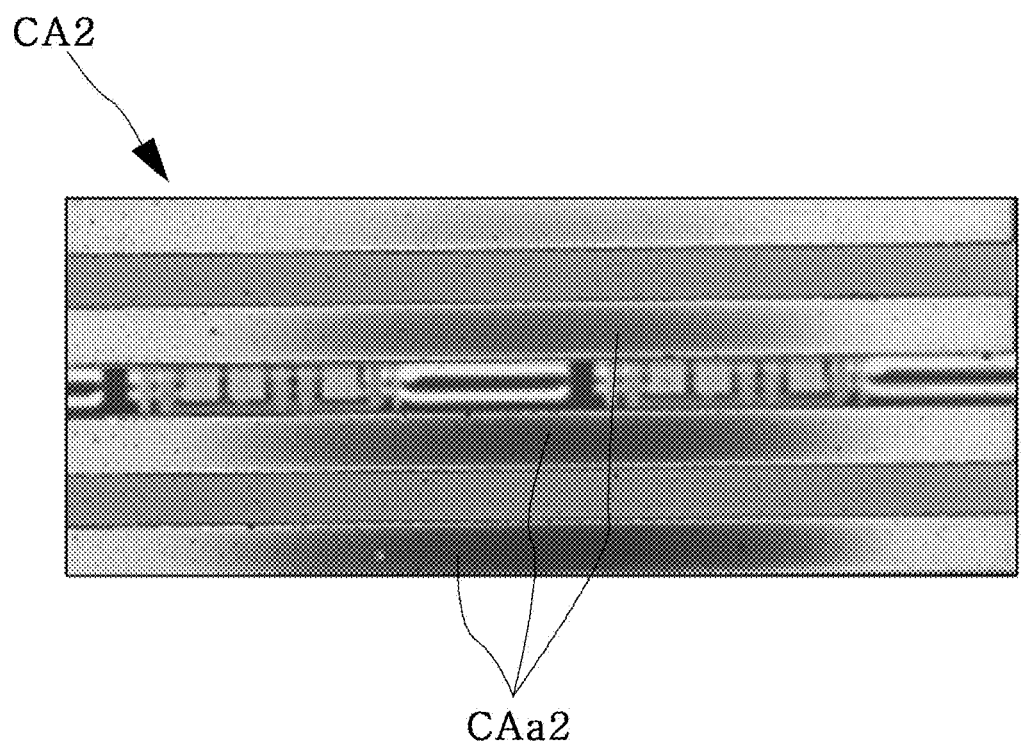
FIG. 10 illustrates an image captured by an optical inspection device according to an embodiment.
Figure 11:
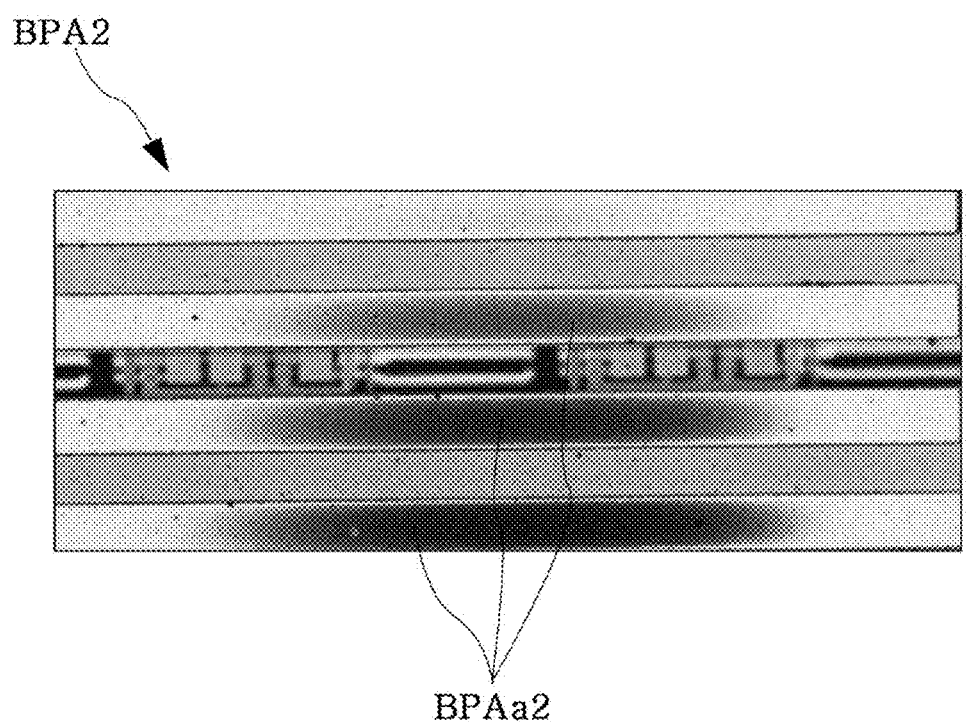
FIG. 11 illustrates an image obtained by processing the image of FIG. 10.

FIG. 8 is an image captured by an optical inspection device according to an embodiment, FIG. 9 is an image obtained by processing the image of FIG. 8, FIG. 10 is an image captured by an optical inspection device according to an embodiment, and FIG. 11 is an image obtained by processing the image of FIG. 10.

The inspection method according to the present embodiment is similar to the inspection method of the embodiment described with respect to FIGS. 5 to 7, but two or more images irradiated with visible light of two or more colors for a same target to be inspected are captured and processed. Herein, the two or more colors may include two colors having, for example, a complementary color relationship to increase (or maximize) a deviation of the image of the target to be inspected.

When the target to be inspected in the target object 100 is a colored film or an opaque film, the second light source unit 520 of the optical inspection device 500 is selected to irradiate the target object 100 with visible light of a first single color through the second optical path OP2. In this case, the color selector 522 may select a wavelength of an irradiated color by aligning a color filter of the first color to a position of the second optical path OP2.

The first color may be, for example, a color of a wavelength having highest reflectivity of the visible light of the first color with respect to the film to be inspected in the target object 100.

For example, FIG. 8 is an image CA1 captured by selecting a yellow color filter by the color selector 522. An image CAa1 of the target to be inspected in FIG. 8 has higher luminance than its surroundings, which is due to the visible light of the high reflectivity of the first color (yellow) with respect to the film to be inspected.

Next, the image processing unit 600 further increases (or maximizes) the deviation of the remaining area of the image CAa1 of the target to be inspected through image processing, such as binarization processing of the captured image CA1. FIG. 9 is an image BPA1 processed by binarizing the image CA1 of FIG. 8. In the processed image BPA1, the image BPAa1 of the target to be inspected has higher luminance and is more clearly visible compared to a surrounding background.

Next, the second light source unit 520 of the optical inspection device 500 is selected to irradiate the target object 100 with visible light of a second single color through the second optical path OP2. In this case, the color selector 522 may select a wavelength of an irradiated color by aligning a color filter of the second color to a position of the second optical path OP2.

The second color may be, for example, a color of a wavelength having highest absorption of the visible light of the second color with respect to the film to be inspected in the target object 100.

For example, FIG. 10 is an image CA2 captured by selecting an indigo color filter, which is a complementary color of yellow, by the color selector 522. An image CAa2 of the target to be inspected in FIG. 10 has lower luminance than its surroundings, which is due to the visible light of the high absorption of the second color, (indigo) with respect to the film to be inspected.

Next, the image processing unit 600 further increases (or maximizes) the deviation of the remaining area of the image CAa2 of the target to be inspected through image processing, such as binarization processing for the captured image CA2. FIG. 11 is an image BPA2 processed by binarizing the image CA2 of FIG. 10.

In the processed image BPA2, the image BPAa2 of the target to be inspected has lower luminance and is more clearly visible compared to a surrounding background.

A difference in luminance of the corresponding area is maximized in the images BPA1 and BPA2, obtained by irradiating the visible light of the first color and the second color in the complementary color relationship. For example, a difference in the luminance of the images BPAa1 and BPAa2 to be inspected in the processed images BPA1 and BPA2 is increased (or maximized) so that one is relatively bright and the other is relatively dark.

As such, it is possible to improve (or maximize) cleanness of the target object by merging luminance intensities of the images BPAa1 and BPAa2 of the target to be inspected with a maximum deviation. This will be described with reference to FIGS. 12 to 16 together with FIGS. 8 to 11.

Figure 12:
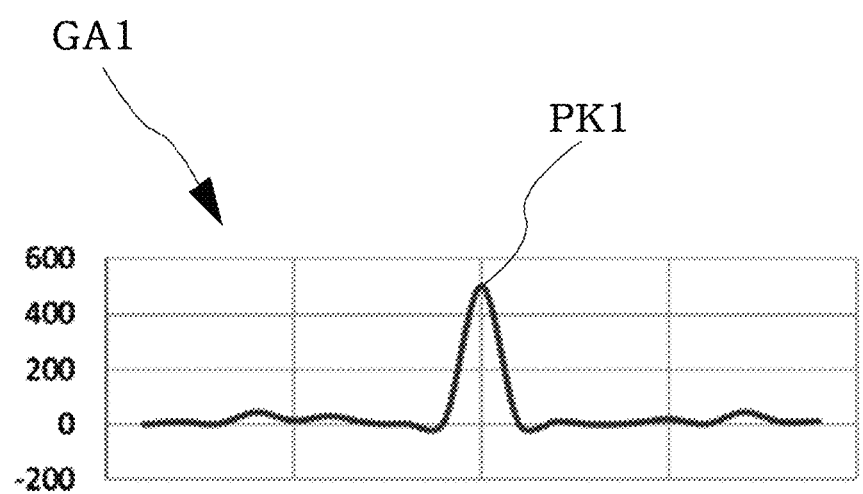
FIG. 12 is a graph showing luminance of the image of FIG. 9.
Figure 13:
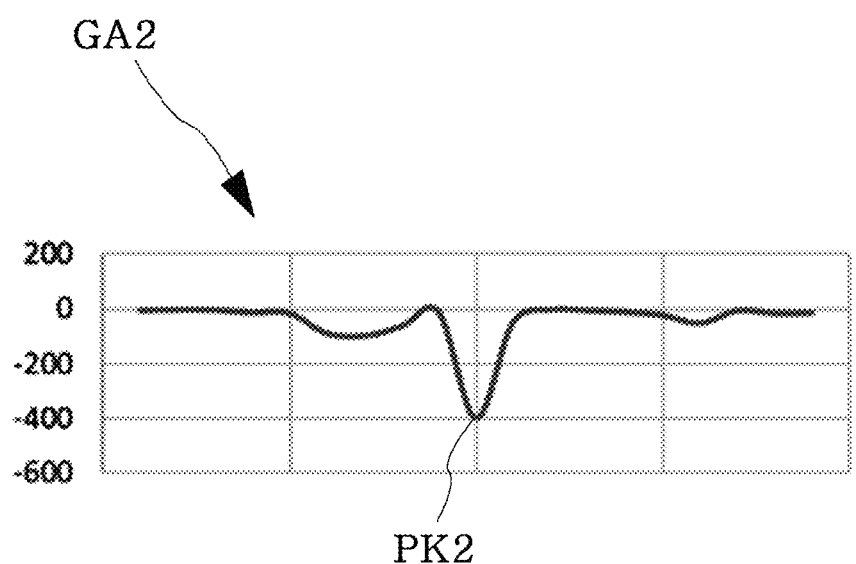
FIG. 13 is a graph showing luminance of the image of FIG. 11.
Figure 14:
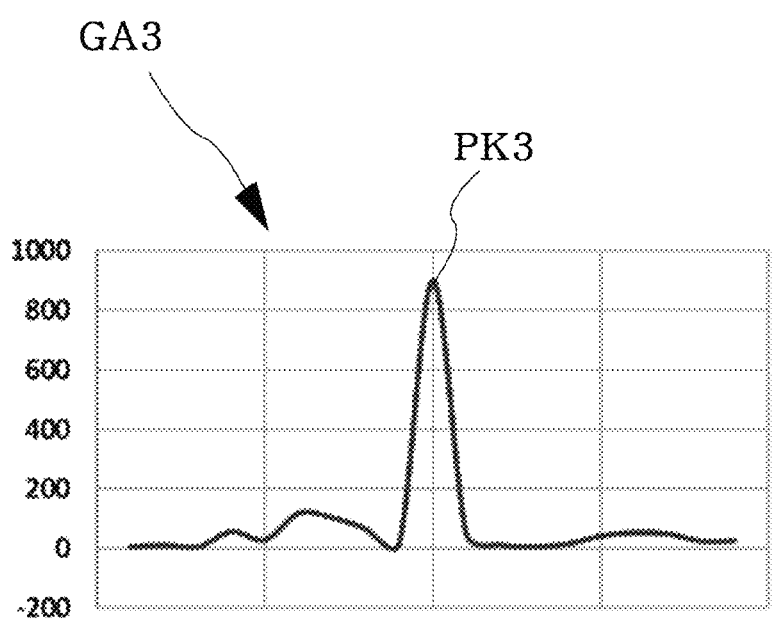
FIG. 14 is a graph obtained by merging luminance intensity of the graph of FIG. 12 and the graph of FIG. 13.
Figure 15:
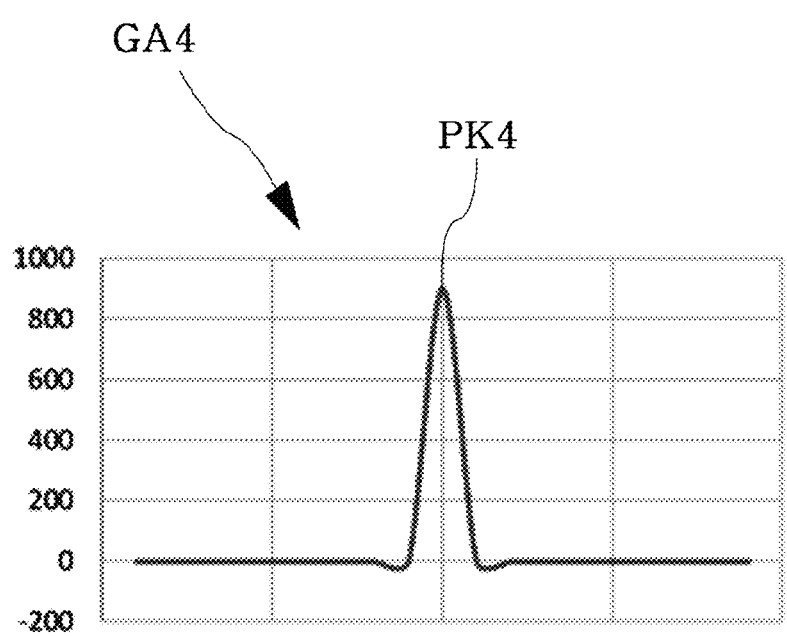
FIG. 15 is a graph obtained by removing noise from the graph of FIG. 14.
Figure 16:
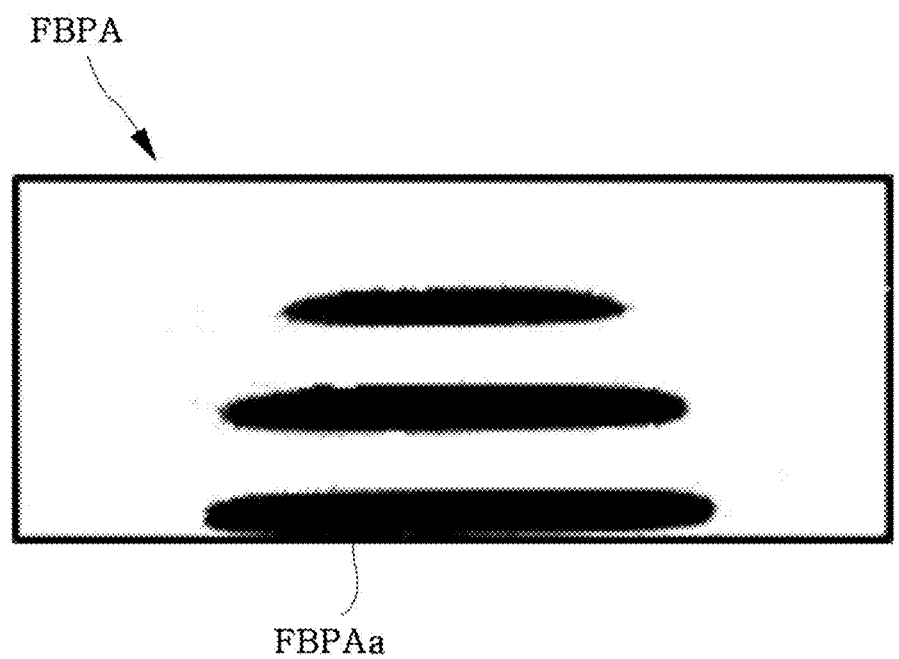
FIG. 16 illustrates an image extracted according to the graph of FIG. 15.

FIG. 12 is a graph showing luminance of the image of FIG. 9, FIG. 13 is a graph showing luminance of the image of FIG. 11, FIG. 14 is a graph obtained by merging luminance intensity of the graph of FIG. 12 and the graph of FIG. 13, FIG. 15 is a graph obtained by removing noise from a graph of FIG. 14, and FIG. 16 is an image extracted according to the graph of FIG. 15.

FIG. 12 is a graph GA1 showing luminance of the processed image BPA1 of FIG. 9, which has a peak PK1 corresponding to the image BPAa1 of the target to be inspected. FIG. 13 is a graph GA2 showing luminance of the processed image BPA2 of FIG. 11, which has a peak PK2 corresponding to the image BPAa2 of the target to be inspected.

A graph GA3 of FIG. 14 is a graph showing the intensities of the graph GA1 of FIG. 12 and the graph GA2 of FIG. 13 to maximize the deviation in the luminance of the image of the target to be inspected from the surroundings. In this case, the graph GA2 of FIG. 13 is inverted to be positive and then merged with the graph GA1 of FIG. 12. Accordingly, as shown in FIG. 14, a peak PK3 may be obtained by merging the intensities of the peaks PK1 and PK2 of the two graphs GA1 and GA2.

Next, as shown in FIG. 15, a graph GA4, in which a peak PK4 corresponding to the target to be inspected is more clearly displayed, may be obtained by removing unnecessary noise from the graph GA3 of FIG. 14.

The image processing illustrated in FIGS. 12 to 15 may be performed by the image processing unit 600. FIG. 16 is an example of an extracted image FBPA including an image FBPAa of the target to be inspected corresponding to the graph GA4 obtained through such image processing.

The image FBPAa of the extracted image FBPA of FIG. 16 is sharper because the luminance deviation from the background is further improved (or maximized) compared to the image BPAa of the target to be inspected in the extracted image BPA of FIG. 7, described above. Accordingly, even when the film to be inspected does not have a large color difference from its surroundings, a clearer image of the target to be inspected may be extracted through processing of two or more images obtained by irradiating visible light of two or more colors. Accordingly, it is possible to accurately and easily inspect foreign material presence, a defect, and/or a residual film of the film to be inspected.

According to the present embodiment, the first light source unit 510 may be omitted (or may not be used or utilized) in the optical inspection device 500 shown in FIG. 1.

While the present disclosure has been described in connection with what is presently considered to be practical embodiments, it is to be understood that the present disclosure is not limited to the disclosed embodiments but is intended to cover various modifications and equivalent arrangements included within the spirit and scope of the appended claims and their equivalents.

DESCRIPTION OF SOME SYMBOLS

100: target object to be inspected
500: optical inspection device
510: first light source unit
520: second light source unit
521: white light source unit
522: color selector
523: driver
531: turntable
532: white color filter
533, 534, 535, 536, 537, 538, 539: color filter(s)
540: barrel
541, 542: light-transmitting portion
550: camera
560: optical unit
600: image processing unit
BA1, BA2: background area BPA, FBPA: extracted image
BPA1, BPA2: processed image
BPAa, BPAa1, BPAa2, CAa, CAa1, CAa2, FBPAa, WAa: image of target to be inspected
CA, CA1, CA2, WA: captured image
CE: center
FA1, FA2: fringe region
GA1, GA2, GA3, GA4: graph
OB, OP1, OP2: optical path
PK1, PK2, PK3, PK4: peak

What is claimed is:

1. An optical inspection device comprising:
a barrel forming an optical path, the barrel having a first opening at a first side of the barrel and a second opening at a second side of the barrel;
a first light source unit adjacent to the first opening of the barrel and configured to irradiate light of a first wavelength range into the optical path in the barrel to a target to be inspected through a first light path;
a second light source unit adjacent to the second opening of the barrel, the second side being different from the first side, and configured to irradiate light of a second wavelength range that is different from the first wavelength range into the optical path in the barrel to the target to be inspected through a second light path; and
a camera configured to receive the light of the first light source unit or the second light source unit reflected by the target to be inspected through the optical path in the barrel,
wherein at least a portion of the first light path is different from the second light path.

2. The optical inspection device of claim 1, wherein the first light source unit is configured to emit ultraviolet or infrared light, and
wherein the second light source unit is configured to emit light of a visible range.

3. The optical inspection device of claim 2, wherein the second light source unit comprises a white light source and a color selector between the white light source and the barrel, the color selector comprising a plurality of color filters.

4. The optical inspection device of claim 3, wherein the color selector further comprises a rotatable turntable, and
wherein the color filters are at an edge of the rotatable turntable.

5. The optical inspection device of claim 3, wherein the color filters comprise a white filter and a plurality of color filters.

6. The optical inspection device of claim 3, further comprising a driver configured to select one of the color filters and align it with the second light path according to a color or transparency of a target to be inspected.

7. The optical inspection device of claim 3, wherein the color filters comprise a plurality of color filters having a complementary color relationship with each other.

8. The optical inspection device of claim 2, further comprising an image processing unit configured to receive an image captured by the camera and to process the image to extract an image of a target to be inspected.

9. The optical inspection device of claim 8, wherein the image processing comprises binarization processing.

10. An optical inspection device comprising:
a barrel having a first opening at a first side of the barrel and a second opening at a second side of the barrel;
a first light source unit adjacent to the first opening and configured to irradiate ultraviolet or infrared light through a first light path;
a second light source unit adjacent to the second opening and configured to irradiate visible light through a second light path, the second light source unit comprising a white light source and a color selector comprising a plurality of color filters; and
a camera configured to capture an image of a target object irradiated with light from the first light source unit or the second light source unit,
wherein at least a portion of the first light path is different from the second light path.

11. The optical inspection device of claim 10, wherein the color selector further comprises a turntable configured to rotate the color filters.

12. The optical inspection device of claim 10, wherein the color filters comprise a plurality of color filters having a complementary color relationship with each other.

13. An inspection method using an optical inspection device, the optical inspection device comprising: a barrel forming an optical path, the barrel having a first opening at a first side of the barrel and a second opening at a second side of the barrel; a first light source unit adjacent to the first opening of the barrel and configured to irradiate ultraviolet or infrared light into the optical path in the barrel to a target object to be inspected through a first light path; a second light source unit adjacent to the second opening of the barrel that is different from the first side of the barrel and configured to irradiate visible light into the optical path in the barrel to the target object to be inspected through a second light path; and a camera configured to receive the light of the first light source unit or the second light source unit the method comprising:
selecting the first light source unit when the target object to be inspected is a transparent film;
selecting the second light source unit when the target object to be inspected is a colored film or an opaque film;
capturing, by the camera, the light of the first light source unit or the second light source unit reflected by the target object to be inspected through the optical path in the barrel; and
capturing, by the camera, an image of the target object to be inspected formed by the light of the selected one of the first light source unit or the second light source unit reflected by the target object to be inspected through the optical path in the barrel.

14. The inspection method of claim 13, wherein the captured image of the target object comprises a fringe area corresponding to the target object to be inspected.

15. The inspection method of claim 14, further comprising processing the captured image of the target object to be inspected to extract the fringe area.

16. The inspection method of claim 13, wherein the second light source unit comprises a white light source and a color selector comprising a plurality of color filters.

17. The inspection method of claim 16, further comprising processing the captured image of the target object to be inspected to extract an image in which a deviation from surroundings of the image of the target object to be inspected is increased.

18. The inspection method of claim 16, wherein the capturing of the image of the target object comprises irradiating visible light of a first color and a second color in a complementary color relationship with the first color to generate a first image and a second image having different luminance for an image of the target object to be inspected.

19. The inspection method of claim 18, further comprising:

processing the first image and the second image; and
extracting an image in which cleanness of the image of the target object to be inspected is increased by merging luminance intensities of the processed first image and the processed second image.

\* \* \* \* \*